United States Patent [19]

Shimizu

[11] Patent Number: 5,444,708
[45] Date of Patent: Aug. 22, 1995

[54] TIME-DIVISION MULTIPLEX RADIO TRANSMISSION APPARATUS

[75] Inventor: Hiroyuki Shimizu, Tokyo, Japan

[73] Assignee: NEC Corporation, Tokyo, Japan

[21] Appl. No.: 84,873

[22] Filed: Jun. 30, 1993

[30] Foreign Application Priority Data

Jun. 30, 1992 [JP] Japan .................................. 4-173453

[51] Int. Cl.$^6$ ............................................. H04B 7/212
[52] U.S. Cl. ................................... 370/95.3; 375/296; 370/105.1
[58] Field of Search ................ 455/13.2, 51.1; 375/59, 375/60, 68, 73, 106, 111; 377/77, 107; 364/724.02; 332/106, 107, 115; 370/77, 95.1, 95.3, 100.1, 104.1, 105.1, 105.2

[56] References Cited

U.S. PATENT DOCUMENTS

| | | | |
|---|---|---|---|
| 4,485,478 | 11/1984 | Takada | 375/68 |
| 4,972,506 | 11/1990 | Uddenfeldt | 370/95.3 |
| 5,007,088 | 4/1991 | Ooi et al. | 370/105.1 |

Primary Examiner—Benedict V. Safourek
Attorney, Agent, or Firm—Ostrolenk, Faber, Gerb & Soffen

[57] ABSTRACT

A time-division multiplex radio transmission apparatus includes a first frequency divider, a logic processing unit, a digital filter, a modulation unit, a high-frequency amplification unit, and a second frequency divider. The first frequency divider frequency-divides an input clock signal to output a first frequency-divided clock signal. The logic processing unit performs logic processing of an input data signal on the basis of the first frequency-divided clock signal and outputs a burst timing signal. The digital filter is reset in response to the burst timing signal and converts output data from the logic processing unit into a modulation baseband signal on the basis of the input clock signal. The modulation unit modulates an output signal from the digital filter. The high-frequency amplification unit performs burst-waveform processing of an output signal from the modulation unit for each time slot for time-division transmission on the basis of the burst timing signal. The second frequency divider outputs a second frequency-divided clock signal obtained by frequency-dividing the input clock signal to reset the first frequency divider.

5 Claims, 7 Drawing Sheets

FIG.6A
FIG.6B
FIG.6C
FIG.6D
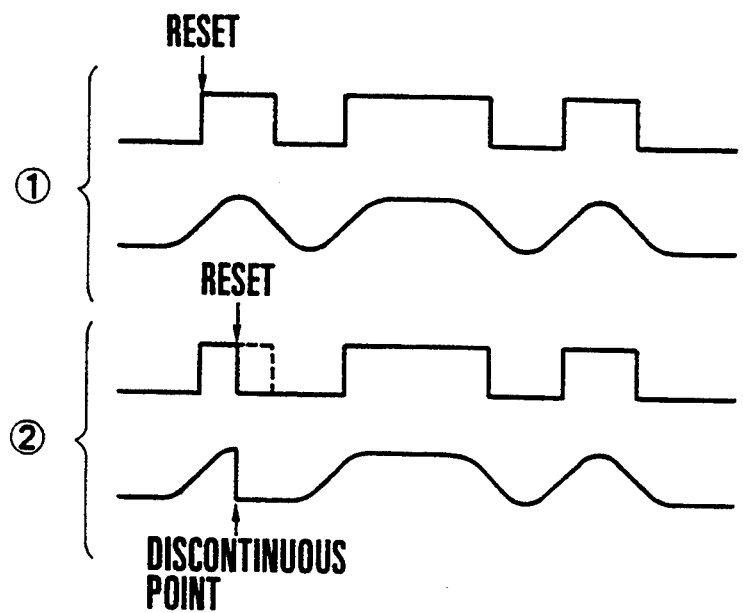
FIG.7A
FIG.7B
FIG.7C
FIG.7D
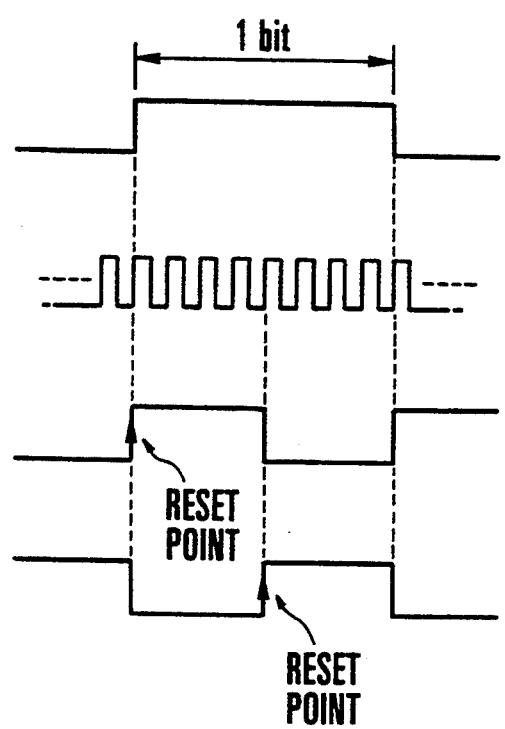

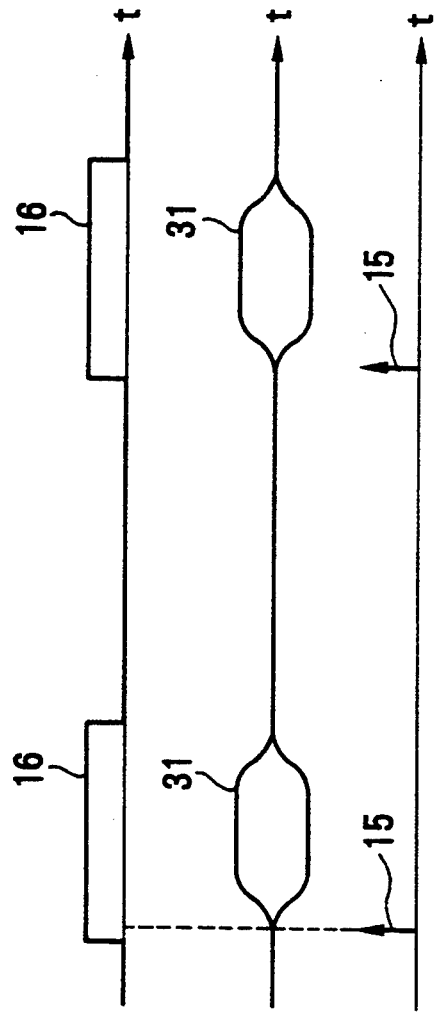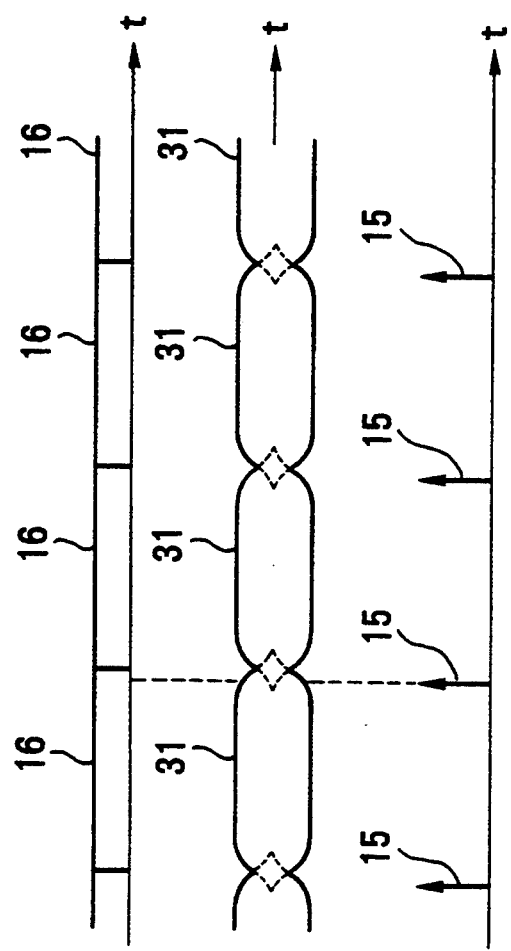
FIG.9A FIG.9B FIG.9C FIG.10A FIG.10B FIG.10C

TIME-DIVISION MULTIPLEX RADIO TRANSMISSION APPARATUS

BACKGROUND OF THE INVENTION

The present invention relates to a radio transmission apparatus and, more particularly, to a radio transmission apparatus for burst-transmitting a radio signal in time-division multiplex radio transmission.

A conventional radio transmission apparatus, as shown in FIG. 8, comprises a logic processing unit, 1, a modulation unit 2, and a high-frequency amplification unit 3.

The logic processing unit 1 includes a logic processing circuit 14 for performing differential conversion and a frequency divider 13. The logic processing unit 1 receives data 11 to be transmitted and an input clock signal 12 having a rate as an integer multiple of the data rate of the data 11.

The rate of the input clock signal 12 is, e.g., 8 times the data rate of the data 11 because the input clock signal 12 is used in a digital filter 21 connected to the output terminal of the logic processing circuit 14. The input clock signal 12 is divided into two components in the logic processing unit 1. One of the two components is transmitted to the modulation unit 2 connected to the output terminal of the logic processing unit 1, and the other is frequency-divided by the frequency divider 13 to have a rate equal to the data rate. In this example, a frequency-division ratio is ⅛. A frequency-divided clock 17 is used as a clock in the logic processing circuit 14. The logic processing circuit 14 extracts the timing signal of each time slot in time-division transmission.

The timing signal may be externally supplied. The timing signal is transmitted as a burst timing signal 15 to the high-frequency amplification unit 3 and the modulation unit 2 connected to the output terminal of the logic processing unit 1.

The modulation unit 2 includes a digital filter 21 and a modulation circuit 22. The digital filter 21 performs wave-shaping of a transmission spectrum in a baseband. For example, the digital filter 21 has a Gaussian filtering function, and converts a signal into a GMSK (Gaussian-filtered minimum shift keying) modulation signal.

The burst timing signal 15 resets the digital filter 21 at the beginning of each time slot, and is used for synchronizing data with a clock in the corresponding time slot.

The modulation circuit 22 modulates a carrier wave by using an output signal from the digital filter 21 as a modulation signal.

The high-frequency amplification unit 3 amplifies a modulated carrier wave 23 output from the modulation unit 2 and transmits it to an antenna 4. At this time, the waveforms of the leading and trailing edges of a burst-like signal are shaped to prevent the unnecessary spread of a spectrum at rise and fall times when the signal of each time slot is burst-transmitted. The burst timing signal 15 is used for adjusting the wave-shaping operations in the high-frequency amplification unit 3. This operation is shown in FIGS. 9A to 9C.

When the burst timing signal 15 shown in FIG. 9C is present for a burst-like data signal 16 shown in FIG. 9A, a high-frequency output signal 31 is smoothly wave-shaped at its leading and trailing edges, as shown in FIG. 9B. For this reason, the unnecessary spread of a spectrum caused by an abrupt change in amplitude of a transmission wave can be prevented.

In a conventional radio apparatus, however, a burst timing signal also resets the digital filter 21. For this reason, when the digital filter 21 is reset, an output from the digital filter 21 is discontinued or is not smoothly changed at a reset timing.

As shown in FIGS. 9A to 9C, assume that the burst timing signal 15 is positioned before the leading edge of the output signal 31, i.e., at a reset point. Even when discontinuity points are generated to spread the spectrum of the signal, the signal having the spread spectrum is not radiated from the antenna 4. Even if the signal is radiated, the level of the signal is very low, and the signal does not influence an adjacent frequency channel.

In a carrier wave transmission apparatus in which all time slots must be set in a transmission state as in the control channel of a base station of a mobile telephone system, signals are set in the states shown in FIGS. 10A to 10C. That is, as shown in FIG. 10A, time slots for transmitting the burst-like signals 16 are continuously used. For this reason, at a boundary between adjacent time slots, as shown in FIG. 10B, the digital filter 21 is reset by the burst timing signal 15 shown in FIG. 10C before the level of the immediately preceding high-frequency output signal 31 is sufficiently decreased.

For this reason, the high-frequency signal having a spectrum which is unnecessarily spread due to data discontinuity caused by the reset is radiated from the antenna 4. The high-frequency signal interferes with another communication using an adjacent frequency channel, and normal communication is not easily performed.

SUMMARY OF THE INVENTION

It is an object of the present invention to provide a time-division multiplex radio transmission apparatus for preventing the unnecessary spread of a spectrum of a transmission wave in a boundary between time slots adjacent to each other.

It is another object of the present invention to provide a time-division multiplex radio transmission apparatus which does not interfere with communication using an adjacent frequency channel.

In order to achieve the above objects, according to the present invention, there is provided a time-division multiplex radio transmission apparatus comprising first frequency-division means for frequency-dividing an input clock signal to output a first frequency-divided clock signal, logic processing means for performing logic processing of an input data signal on the basis of the first frequency-divided clock signal and outputting a burst timing signal, digital filter means, reset in response to the burst timing signal, for converting output data from the logic processing means into a modulation baseband signal on the basis of the input clock signal, modulation means for modulating an output signal from the digital filter means, high-frequency amplification means for performing burst-waveform processing of an output signal from the modulation means for each time slot for time-division transmission on the basis of the burst timing signal, and second frequency-division means for outputting a second frequency-divided clock signal obtained by frequency-dividing the input clock signal to reset the first frequency-division means.

BRIEF DESCRIPTION OF THE DRAWINGS

FIGS. 6A to 6D are input/output waveform charts of the digital filter;

FIGS. 7A to 7D are timing charts showing a relationship between an input data and input/output clock signals of a second frequency divider;

FIGS. 9A, 9B and 9C are timing charts showing a case wherein time slots are not continuously used; and FIGS. 10A, 10B and 10C are timing charts showing a case wherein time slots are continuously used.

DESCRIPTION OF THE PREFERRED EMBODIMENT

An embodiment of the present invention will be described below with reference to the accompanying drawings.

Figure 1:
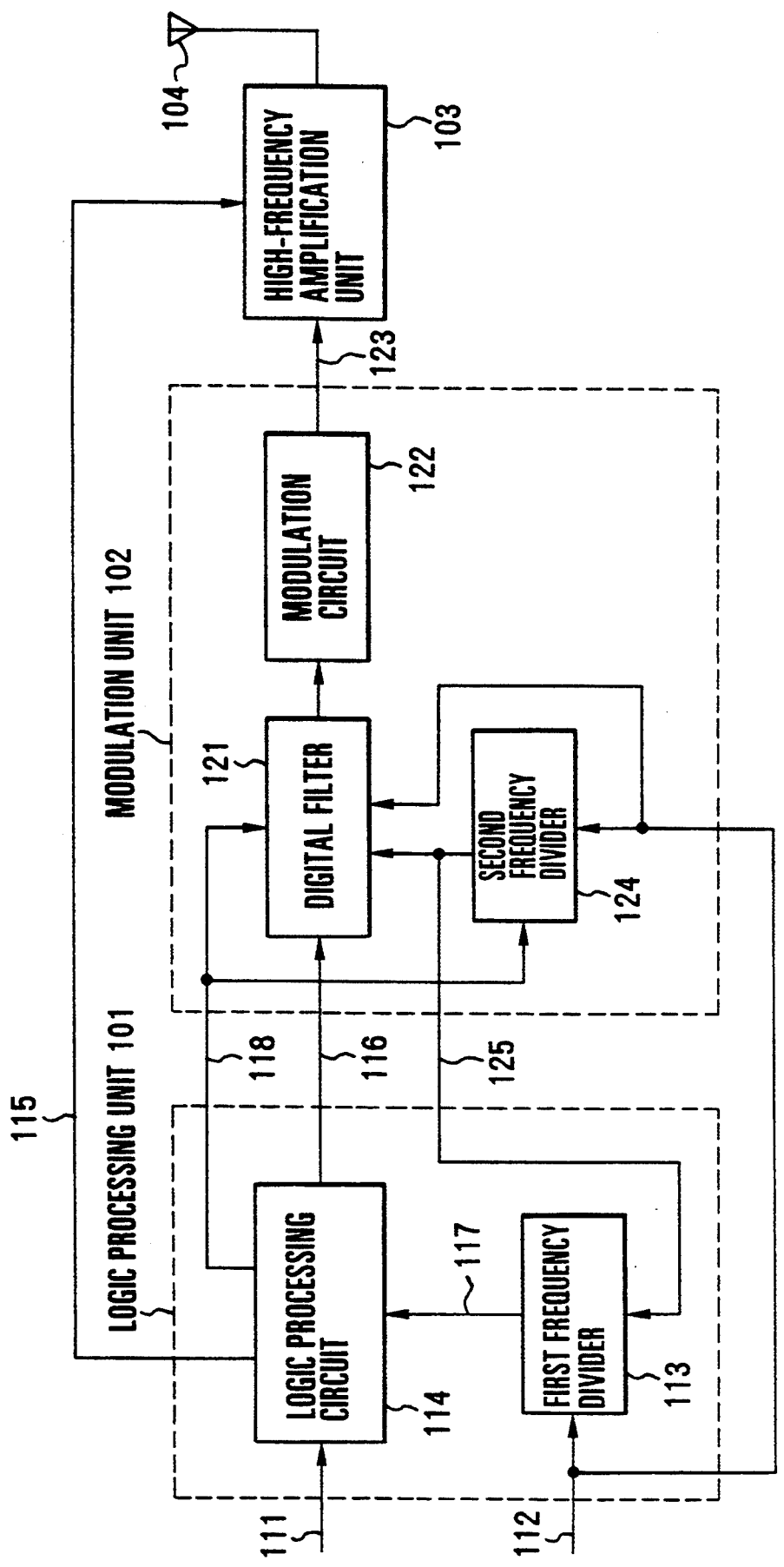
FIG. 1 is a block diagram showing an embodiment of a time-division multiplex radio transmission apparatus according to the present invention.

FIG. 1 shows an embodiment of a time-division multiplex radio transmission apparatus to which the present invention is applied. The radio transmission apparatus is divided into three blocks, i.e., a logic processing unit 101, a modulation unit 102, and a high-frequency amplification unit 103.

The logic processing unit 101 comprises a logic processing circuit 114 and a first frequency divider 113. The logic processing circuit 114 performs logic processing such as differential conversion to a data signal 111 input to the transmission apparatus and independently extracts burst timing signals 115 and 118. The first frequency divider 113 ⅛-frequency-divides a clock signal 112 having a rate eight times a data rate to obtain a clock signal having the rate equal to that of the data signal 111. The burst timing signal 115 is output in correspondence with each time slot for time-division transmission, and the burst timing signal 118 is output only once in synchronization with the burst timing signal 115 at the beginning of a transmission operation.

The modulation unit 102 includes a digital filter 121, a modulation circuit 122, and a second frequency divider 124. The digital filter 121 converts a signal 116 subjected to logic processing by the logic processing circuit 114 into a baseband signal for modulation. For example, the digital filter 121 has a Gaussian filtering function and converts the signal 116 into a GMSK baseband signal.

The modulation circuit 122 has, e.g., a quadrature modulator as a main constituent element, and the modulation circuit 122 also includes a frequency converter for mixing up a frequency to a high-frequency band when modulation is performed in an intermediate frequency band.

Figure 8:
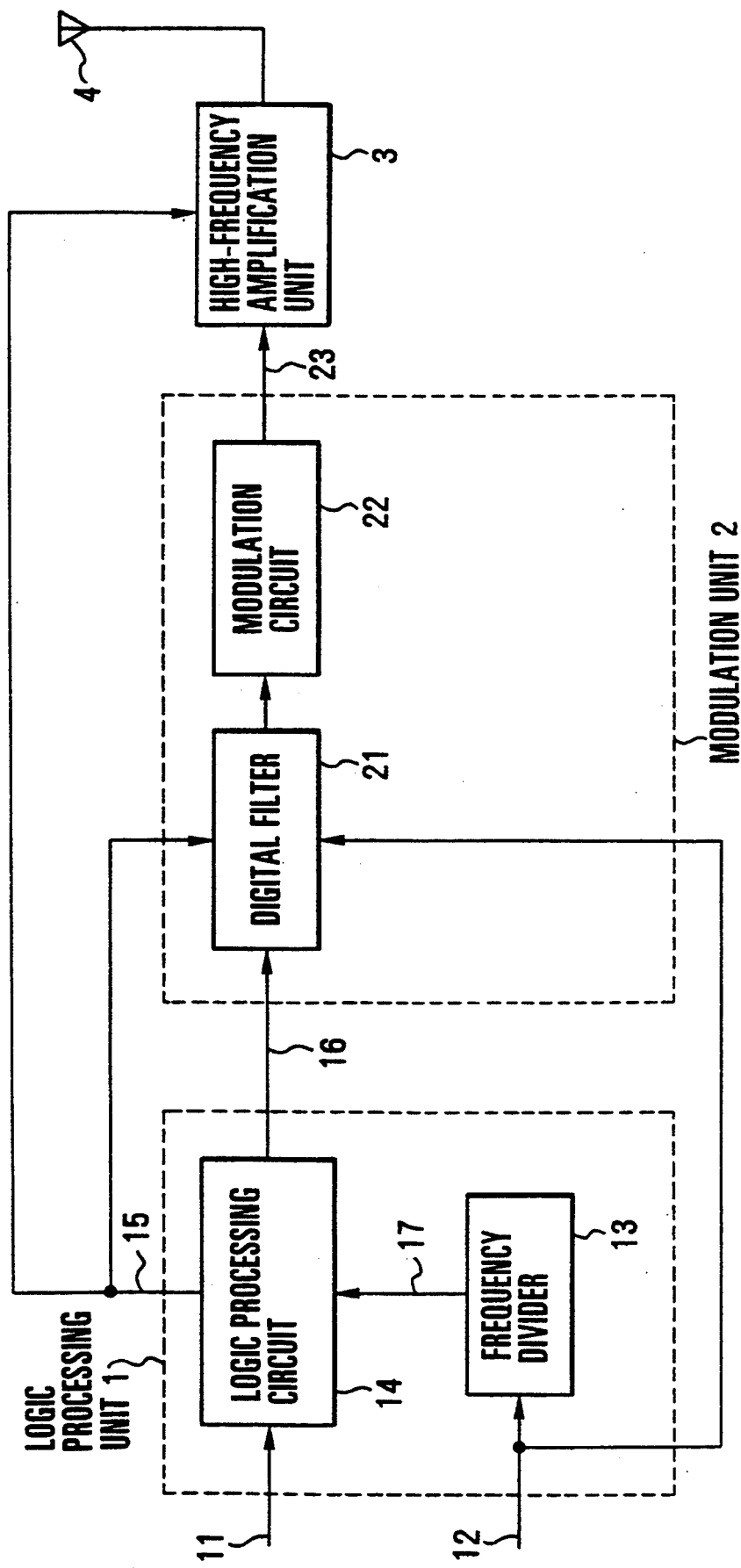
FIG. 8 is a block diagram showing a conventional time-division multiplex radio transmission apparatus.

The second frequency divider 124 ⅛-frequency-divides the clock signal 112 used in the digital filter 121 to produce a clock signal 125 having the rate equal to the data rate, and the frequency divider 124 is reset only once together with the digital filter 121 at the beginning of transmission operation in response to the burst timing signal 118. The clock signal 125 is used inside the digital filter 121 (to be described later), and is also used as a reset signal for the first frequency divider 113 of the logic processing unit 101. In the prior art in FIG. 8, the second frequency divider 124 is incorporated in the digital filter 21.

The high-frequency amplification unit 103 amplifies a modulated carrier wave 123 from the modulation circuit 122 to a level which is high enough to radiate the modulated carrier wave 123 from an antenna 104. In addition, the waveforms of envelopes are shaped such that a high-frequency output signal 131 smoothly rises and falls in response to the burst timing signal 115 as shown in FIG. 10B, thereby preventing the unnecessary spread of a spectrum which is caused by an abrupt change in amplification. The burst timing signal 115 is input to the high-frequency amplification unit 103 in correspondence with each time slot to adjust the timings of the above wave shaping operations.

Figure 2:
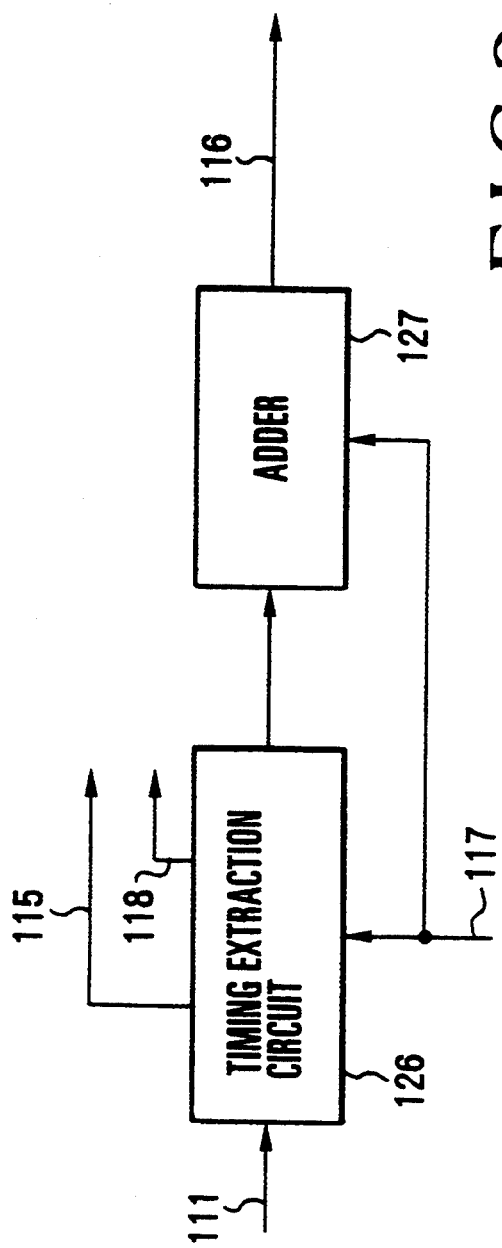
FIG. 2 is a block diagram showing an arrangement of the logic processing circuit in FIG. 1.
Figure 3:
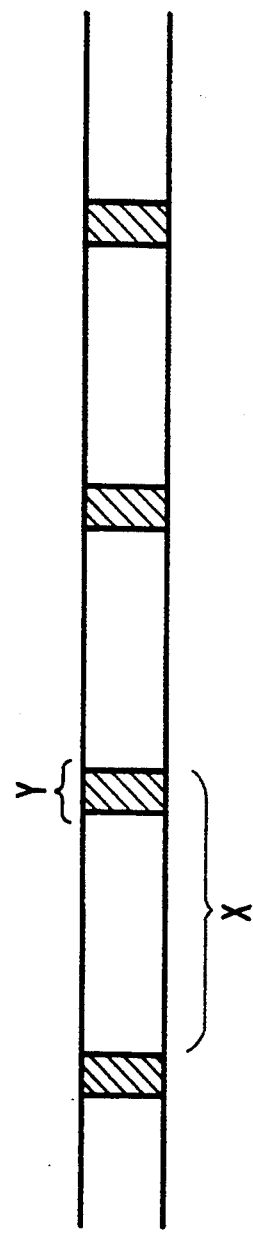
FIG. 3 is a view for explaining the format of an input data signal.

FIG. 2 shows an arrangement of the logic processing circuit 114 in FIG. 1. Referring to FIG. 2, the input data 111 to be input to a timing extraction circuit 126 is transmitted in the format shown in FIG. 3. Although a set of input data is transmitted for each burst component (e.g., 512 bits), a known specific pattern (e.g., 32 bits, continuity of 101010 . . . ) Y is added to the beginning of each component so as to distinguish one component from another.

Figure 4:
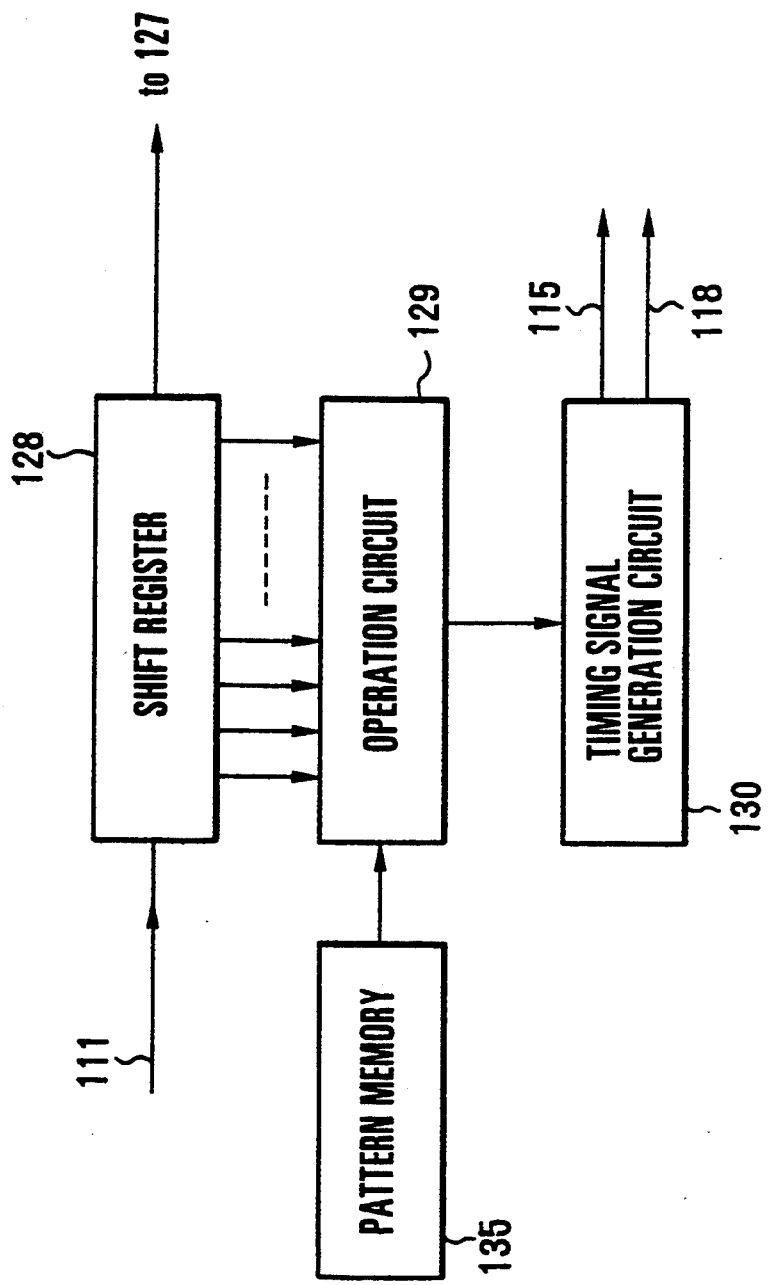
FIG. 4 is a block diagram showing an arrangement of the timing extraction circuit in FIG. 2.

The timing extraction circuit 126 has an arrangement shown in FIG. 4. Outputs from a pattern memory 135 in which the known specific patterns are stored and parallel outputs from a shift register 128 to which the input data 111 are serially input are sequentially compared with each other and calculated (e.g., when the patterns coincide with each other, and the outputs are added to each other in the binary system, all resultant values become "0"), and a specific pattern is detected. At this time, the burst timing signals 115 and 118 are generated by a timing signal generation circuit 130.

An adder 127 in FIG. 2 is used for facilitating demodulation in a demodulation operation in a receiver side. The adder 127 sequentially calculates sums in the binary system, e.g., the sum of the first and second input data, the sum of the second and third data, . . . , and these sums are used as output data from the adder.

Figure 5:
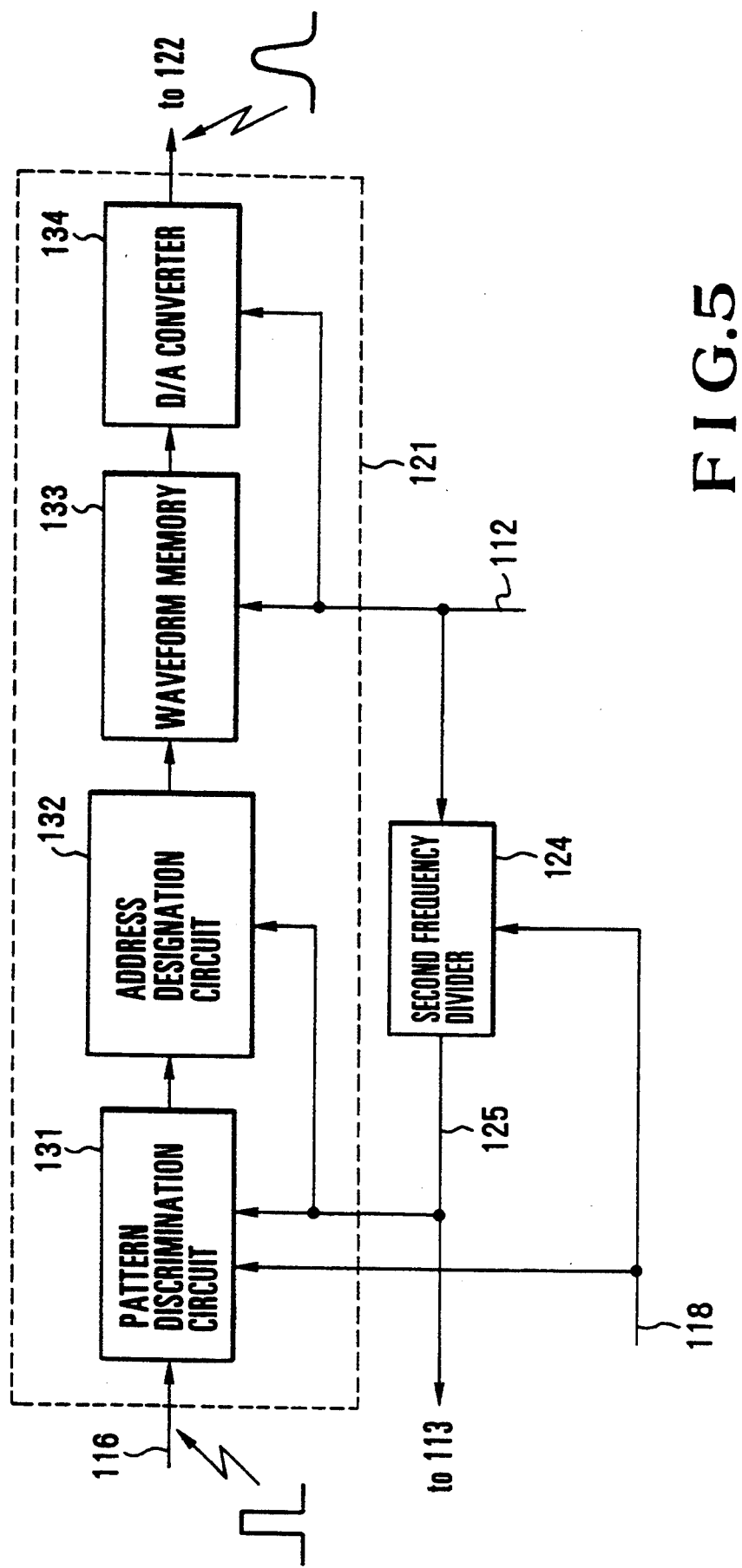
FIG. 5 is a block diagram showing an arrangement of the digital filter in FIG. 1.

FIG. 5 shows an arrangement of the digital filter 121 in FIG. 1. The digital filter 121 operates to moderate an abrupt change in a digital signal serving as a rectangular wave. In each bit, the analog waveform of an output is changed depending on the patterns before and after an input signal. In FIG. 5, a pattern discrimination circuit 131 discriminates the pattern of the input signal 116. An address designation circuit 132 designates the address of a waveform memory 133, in which the output waveform is stored, depending on a discrimination output from the pattern discrimination circuit 131. The waveform memory 133 outputs a digital signal of the address-designated waveform because the waveform memory 133 is a digital memory. When the digital signal is converted into an analog signal by a D/A converter 134, a desired waveform can be obtained.

The D/A converter 134 or the waveform memory 133 requires the clock signal 112 having a rate higher (in this case, 8 times) than that of a conventional clock because the D/A converter 134 or the waveform memory 133 handles a signal having a subdivided analog waveform.

On the other hand, the pattern discrimination circuit 131 uses the clock signal 125 output from the second frequency divider 124 and having a rate equal to that of input data because the pattern discrimination circuit 131 performs comparison and discrimination operations for only each bit of an original signal.

An operation of the time-division multiplex radio transmission apparatus arranged as described above will be described below with reference to FIG. 1. When the input data signal 111 is input to the logic processing circuit 114 of the logic processing unit 101, the logic processing circuit 114 performs logic processing (to be described later) on the basis of a clock signal from the first frequency divider 113. At this time, the logic processing circuit 114 outputs the burst timing signals 115 and 118 in synchronization with each time slot. When data logically processed by logic processing circuit 114 is input to the digital filter 121 of the modulation unit 102, the digital filter 121 converts the data into a modulation baseband signal on the basis of the clock signal 112 and the clock signal 125 from the second frequency divider 124. At this time, the digital filter 121 and the second frequency divider 124 are reset only once at the beginning of a transmission operation in response to the burst timing signal 118 from the logic processing circuit 114. The baseband signal from the digital filter 121 is quadrature-modulated in the clock signal 112, and the high-frequency amplification unit 103 shapes the waveforms of envelopes such that the leading and trailing edges of a burst-like transmission signal are smoothed. The resultant signal is radiated from the antenna 104. At this time, the high-frequency amplification unit 103 is reset in response to the burst timing signal 115 from the logic processing circuit 114 each time the time slot is started.

In order to normally operate the digital filter 121 of the modulation unit 102, a data signal must be synchronized with a clock signal in each time slot.

In the present invention, a reset operation of the digital filter 121 for synchronizing the data signal with the clock signal is performed only once using the burst timing signal 118 at the beginning of the operation of the apparatus. A reason for this is as follows. That is, as described above, the timing of a clock signal 117 of the logic processing unit 101 is always synchronized with the timing of the clock signals 112 and 125 of the modulation unit 102 because the first frequency divider 113 is reset for each bit in response to the clock signal 125 serving as an output signal from the second frequency divider 124.

This operation will be described below with reference to FIGS. 6A to 6D and FIGS. 7A to 7D. Although the logic processing unit 101 and the modulation unit 102 use clock signals, the modulation unit 102 also uses a clock signal having a rate eight times an input data rate because the digital filter 121 is used in the modulation unit 102. For this reason, as described above, a clock signal (FIG. 7B) having a rate eight times that of the 1-bit input data signal shown in FIG. 7A is given to the modulation unit 102 and the logic processing unit 101, and the resultant signals are frequency-divided to obtain required clock signals.

However, when the logic processing unit 101 and the modulation unit 102 independently perform frequency divisions, as shown in FIGS. 7C and 7D, two types of clock signals whose phases are opposite to each other may be formed as two frequency-divided clock signals from the logic processing unit 101 and the modulation unit 102. In this case, when the clock signal 125 from the second frequency divider 124 has the same phase as that of the clock signal in FIG. 7C, the reset point of the clock signal 125 coincides with the leading edge of the input data signal 116 in FIG. 7A. However, when the phase of the clock signal 125 has the same phase as that of the clock signal in FIG. 7D, the reset point of the clock signal in FIG. 7D does not coincide with the leading edge of the input data signal 116 in FIG. 7A.

When the phase of the clock signal 125 has the same phase as that of the clock signal in FIG. 7D, as shown in FIG. 6C, the input data signal 116 is reset at a point except for a boundary point between bits in the digital filter 121. For this reason, as shown in FIG. 6D, an output waveform has discontinuous points.

According to the present invention, the clock signal 125 always has the same phase as that of the clock signal in FIG. 7C because the two frequency-divided signals 112 and 125 are synchronized with each other, and an output waveform from the digital filter 121 becomes the waveform shown in FIG. 6B and has no discontinuous points.

With the above arrangement, even when time slots are continuously used as shown in FIGS. 10A to 10C, a data signal can be synchronized with a clock signal without discontinuity of data, i.e., without the unnecessary spread of a spectrum.

As has been described above, according to the present invention, a digital filter need not be reset for each time slot to synchronize timings with each other because a clock signal used in a modulation unit is synchronized with a clock signal used in a logic processing unit. For this reason, even when continuous time slots are used, the digital filter is not reset for each time slot. Therefore, a modulated data signal has no discontinuity, and the unnecessary spread of a spectrum does not occur.

The present invention has an effect of preventing interference with an adjacent frequency channel. That is, a circuit arranged on the assumption that continuous time slots are not used as in a mobile station can be used in a case wherein continuous timing slots are used as in a base station when only part of a circuit is added to the circuit arranged on the assumption that continuous time slots are not used.

That is, integrated circuits such as digital filters and modulators which are mass-produced for mobile stations and provided at low cost can be directly used in circuits for base stations. For this reason, an excellent effect that compact radio transmission apparatus can be economically constituted is obtained.

What is claimed is:

1. A time-division multiplex radio transmission apparatus for transmitting a time-division multiplexed output signal having a plurality of time slots, the apparatus comprising:

first frequency-division means for frequency-dividing an input clock signal to output a first frequency-divided clock signal;

logic processing means for performing logic processing of an input data signal on the basis of the first frequency-divided clock signal to output an output data signal and for outputting a burst timing signal;

digital filter means, reset in response to the burst timing signal, for converting the output data signal received from said logic processing means into a modulation baseband signal on the basis of the input clock signal which is inputted to said first frequency-division means;

modulation means for modulating the modulation baseband signal received from said digital filter means and for outputting an output signal;

high-frequency amplification means for amplifying the output signal received from said modulation means and performing waveform shaping of an envelope of the output signal received from said modulation means for each time slot for time-division transmission on the basis of the burst timing signal received from said logic processing means to output a high-frequency output signal having smoothly rising and falling edges; and second frequency-division means for frequency-dividing the input clock signal to output a second frequency-divided clock signal for resetting said first frequency-division means.

2. An apparatus according to claim 1, wherein said digital filter means is reset only once at the beginning of a transmission operation in response to the burst timing signal.

3. An apparatus according to claim 2, wherein the burst timing signal is constituted by a first burst timing signal output to said high-frequency amplification means for each time slot and a second burst timing signal output only once to said digital filter means at the beginning of a transmission operation in synchronization with the first burst timing signal.

4. An apparatus according to claim 1, wherein the second frequency-divided clock signal has a rate equal to the data rate of the input data signal, and said first frequency-division means is reset in response to the second frequency-divided clock signal at a timing of a leading edge of the input data signal.

5. An apparatus according to claim 3, wherein the second frequency-divided clock signal is input to the digital filter means, and said digital filter means outputs an analog signal in response to the first and second frequency-divided clock signals, said analog signal corresponding to the output data signal input to the digital filter means from the logic processing means.

* * * * *